United States Patent [19]

Mizusawa

[11] Patent Number: 4,708,895
[45] Date of Patent: Nov. 24, 1987

[54] PLASTIC FASTENER

[75] Inventor: Akira Mizusawa, Yokohama, Japan

[73] Assignee: Nifco, Inc., Yokohama, Japan

[21] Appl. No.: 912,351

[22] Filed: Sep. 26, 1986

[30] Foreign Application Priority Data

Sep. 30, 1985 [JP] Japan .......................... 60-149373[U]

[51] Int. Cl.[4] .............................................. B60R 13/04
[52] U.S. Cl. ........................................ 428/31; 24/297;
 24/453; 24/573; 411/509; 428/122
[58] Field of Search ................. 428/53, 122, 358, 174,
 428/31; 24/297, 453, 573; 411/508, 509, 510

[56] References Cited

U.S. PATENT DOCUMENTS

| 1,842,586 | 1/1932 | Davidson | 428/122 |
|---|---|---|---|
| 2,990,640 | 7/1961 | Burnbaum | 428/11 X |
| 3,298,374 | 1/1967 | Grundell | 428/122 X |
| 3,768,846 | 10/1973 | Hensley et al. | 446/120 X |
| 3,837,129 | 9/1974 | Losell | 428/34 X |
| 4,340,164 | 7/1982 | Rizzo et al. | 428/122 X |
| 4,627,760 | 12/1986 | Yagi et al. | 24/297 X |

FOREIGN PATENT DOCUMENTS 2820622 11/1979 Fed. Rep. of Germany ...... 428/358

Primary Examiner—Henry F. Epstein
Attorney, Agent, or Firm—Trexler, Bushnell, Giangiorgi & Blackstone, Ltd.

[57] ABSTRACT

A plastic fastener comprises a body including two side walls facing each other, one of the side walls being provided on the inner side with a shoulder, and an elastic engagement piece extending obliquely upwardly from the lower end of one side wall and having a lock piece provided at the free end.

5 Claims, 10 Drawing Figures

PLASTIC FASTENER

FIELD OF THE INVENTION AND RELATED ART STATEMENT

This invention relates to a plastic one-piece molding fastener for fastening a vehicle part to a vehicle body.

Heretofore, certain vehicle parts, particularly moldings have been secured to the vehicle body in a manner as shown in FIGS. 1 and 2.

Referring to FIG. 1, there is shown a molding 1, which is a one-piece molding having a substantially rectangular projection 2 projecting from a mounting surface 1a. The projection 2 has a hook 2a provided at the free end which extends in parallel to the mounting surface 1a.

The end of the projection 2 is locked by a metal lock member 3. The lock member 3 is a rectangular plate stamped to form a wavy engagement opening 5 defining a plurality of engagement projections 4.

The molding is mounted in a mounting hole 6a of the vehicle body 6 as shown in FIG. 2. To mount the molding 1, the lock member 3 is held urged against the back side of the vehicle body 6 with the engagement opening 5 registered with the mounting hole 6a. In this state, the projection 2 of the molding 1 is inserted through the mounting hole 6a from the front side of the vehicle body 6. The hook 2a at the end of the projection 2 of the molding 1 is forcibly inserted through the engagement opening 5 of the lock piece 3 by causing forced elastic deformation of the engagement projections 4 so that the hook 2a is hooked on the engagement projections 4. In this way, the molding 1 is mounted in the mounting hole 6a.

This method of mounting has the following drawbacks.

(i) It is necessary to hold the lock member 3 urged against the back side of the vehicle body 6 to mount the part (e.g. a molding) therein. Since the part 1 is strongly pushed to insert it through the engagement opening 5 of the lock piece 3, it is also necessary to strongly push the back side of the vehicle body 6. Therefore, the operation is very cumbersome and requires time. Particularly, the cumbersomeness of the operation is increased for a part that has to be mounted in a narrow vehicle body space.

(ii) Since the lock member 3 is made of metal, it is subject to rusting. In a vehicle rusting is liable to occur because of the intrusion of rainwater and car-washing water. With long use, therefore, the lock member 3 is liable to be corroded, resulting in detachment of the hook 2a.

(iii) The lock member 3 has to be formed from a thin metal sheet since it has to lock the hook 2a of the projection 2 by elastic deformation of the engagement projections 4. Therefore, the hook 2a is liable to be detached from the engagement opening 5 of the lock member 3 when the fitting part 1 experiences strong vibration in the directions shown by arrow "A" in FIG. 2 while the vehicle is running. Besides, since the force in the direction of arrow "A" acts in the direction of the thickness of the lock piece 3, the engagement projections 4 are liable to be broken or bent due to repetitive application of the force over a long time. In such a case, the part 1 falls off, or rattling results.

(iv) Further, when the part 1 experiences lateral vibrations as shown by arrow "B", it is liable to be displaced since it is not locked in this direction.

OBJECT AND SUMMARY OF THE INVENTION

An object of the invention is to provide a plastic fastener which can facilitate the operation of mounting a part and permits reliable mounting thereof.

To attain the above object of the invention, there is provided a plastic fastener which comprises a body including two side walls facing each other and coupled together by a bottom wall, one of the side walls being provided on the inner side with a shoulder and an elastic engagement piece extending obliquely upwardly from the lower end of at least one of the side walls and having a lock piece provided at the top.

To mount a part on a vehicle body, a projection of the part is inserted between the two side walls of the body, whereby a shoulder provided on the projection is engaged with the side wall inner side shoulder. In this state, the fastener is forced into a mounting hole of the vehicle body. The elastic engagement piece is thus engaged with the edge of the mounting hole with an elastic restoring force, whereby the part is secured to the vehicle body such that it cannot retract. Since the fastener is made of a plastic material, it neither rusts nor corrodes, and can withstand long use. Further, the part can be readily mounted by an operation performed only on one side of the support, and the operability thus can be extremely improved.

BRIEF DESCRIPTION OF THE DRAWINGS

The above and other objects and features of the invention will become more apparent from the following detailed description with reference to the accompanying drawings, in which.

DETAILED DESCRIPTION OF THE PREFERRED EMBODIMENT

Figure 1:
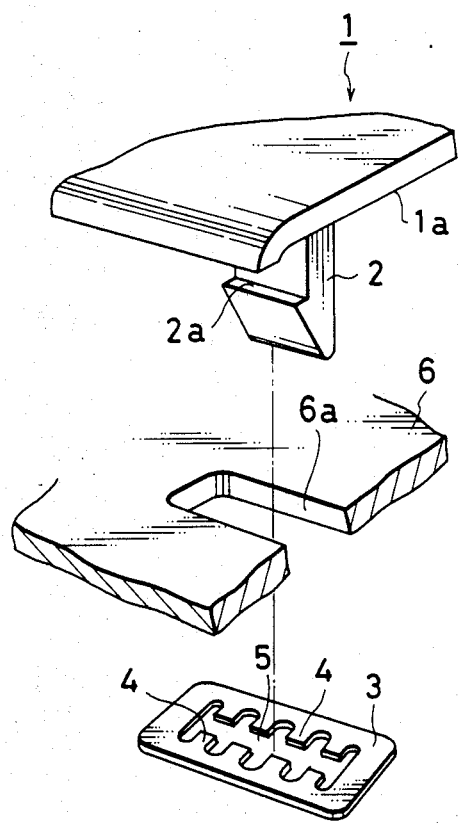
FIG. 1 is a perspective view showing a prior art method of mounting a part.
Figure 2:
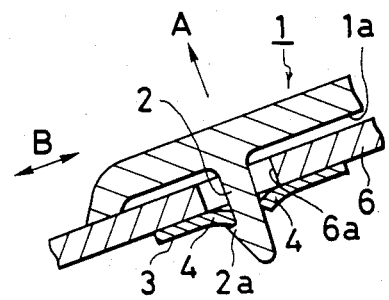
FIG. 2 is a sectional view showing a prior art fastener with a part mounted thereby.
Figure 3:
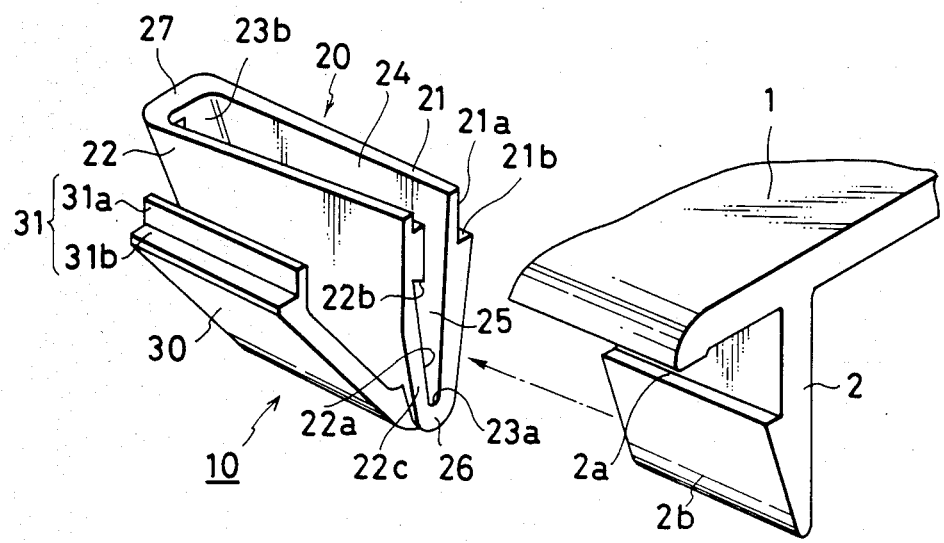
FIG. 3 is a perspective view showing a first embodiment of the fastener according to the invention.
Figure 4:
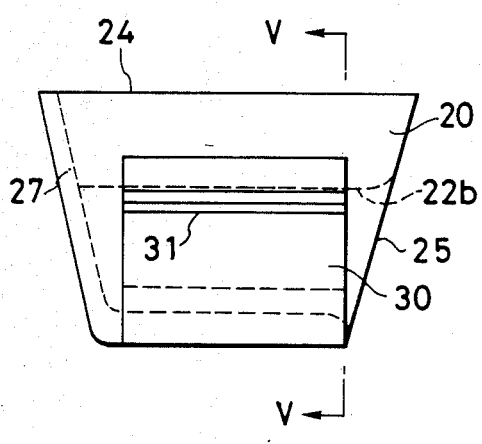
FIG. 4 is a side view showing a fastener according to the invention.
Figure 5:
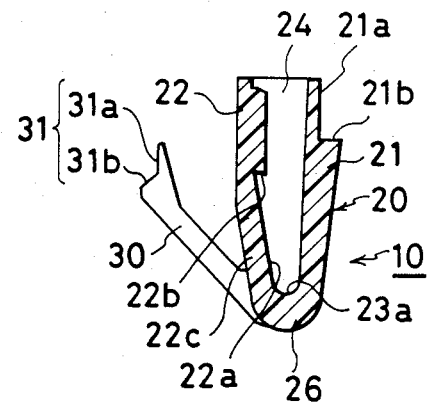
FIG. 5 is a sectional view taken along line V—V in FIG. 4.

FIGS. 3 to 5 illustrate a first embodiment of the plastic fastener according to the invention. This fastener 10 is a one-piece molding of a plastic material consisting of a case-like body 20 and an elastic locking portion 30 extending obliquely upwardly from the lower end of one side of the body 20.

The case-like body 20 has opposed side walls 21 and 22, a bottom wall 26 and an end wall 27. It is open at the top 24 and at one end 25. The bottom and end walls 26 and 27 are greater in thickness than the side walls 21 and 22.

The side walls 21 and 22 have an inverted trapezoidal shape with the width being reduced toward the bottom wall 26. The gap between the side walls 21 and 22 grows slightly narrower with increasing distance from the end wall 27. The inner side of the side wall 22 has a lower inclined surface 22a, and the gap between this wall and the other side wall 21 decreases toward the bottom wall 26.

The side wall 21 has an upper reduced thickness portion 21a terminating in a shoulder 21b which extends substantially in parallel with a bottom surface 23a, i.e. the inside surface of bottom wall 26, over the entire length of the side. The inner inclined surface 22a of the side wall 22 terminates at the upper edge in a shoulder 22b extending substantially parallel to the bottom surface 23a. The shoulder 22b is engaged by a shoulder 2a of a projection 2 of a part 1.

The end of the side wall 21 at the open end 25 preferably has an inwardly tapered surface 22c to facilitate entry of a projection 2 of the fitting part 1 into the body 20 from the open end 25.

A plate-like elastic locking portion 30 having a slightly smaller length than the length of the side wall 22 projects obliquely upwardly from the lower end up to substantially the same level as the shoulder 21b of the side wall 21. The free end of the elastic locking portion 30 has a lock piece 31 consisting of a pawl 31a substantially parallel to the top of the side wall 22 and a shoulder portion 31b.

Now, the method of securing a part using this embodiment of the fastener 10 will be described.

Figure 6:
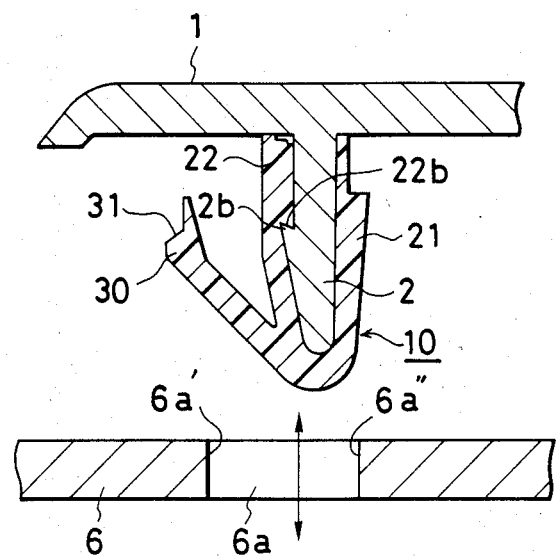
FIG. 6 is a sectional view showing the fastener according to the invention fitted on a part to be mounted.
Figure 7:
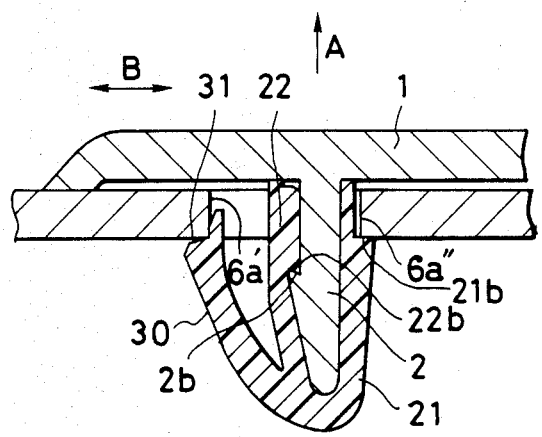
FIG. 7 is a sectional view showing the fastener according to the invention with the part mounted thereby.

First, as shown by an arrow in FIG. 3, the projection 2 of the fitting part 1 is inserted into the case-like body 20 from the open end 25 by forcibly spreading the open end by forced contact of the edge of the projection 2 with the tapered surface 22c. The alignment is such that the hook 2b of the projection 2 is in engagement with the bottom surface 23a of the body 20 and the shoulder 2a in engagement with the shoulder 22b of the side wall 22 and insertion is continued until the projection 2 comes into engagement with the end surface 23b, i.e. the inside surface of end wall 27. After the fastener 10 has been fitted on the projection 2 of the part 1, the fastener 10 is forcibly inserted into the mounting hole 6a of the vehicle body 6 as shown in FIG. 6. At this time, the elastic engagement piece 30 is elastically deformed toward the side wall 22 by the edge 6a' of the mounting hole 6a, and eventually the lock piece 31 of the elastic engagement piece and the shoulder 21b of the side wall 21 become strongly engaged with the opposite side edges 6a' and 6a" of the mounting hole 6a the engagement piece 30 is locked against retreat.

When the fitting part 1 is secured to the mounting hole 6a in this way, the projection 2 is strongly clamped with an elastic restoring force since the gap between the side walls 21 and 22 becomes smaller toward the inlet (i.e., open end 25) in the free state of the body 20. Thus, the fastener 10 will not be detached from the projection 2 even when it experiences strong vibration. Besides, the side walls 21 and 22 are not flexed in the neighborhood of the end wall 27, so that the shoulder 22b will not be detached from the shoulder 2a of the projection 2.

Figure 8:
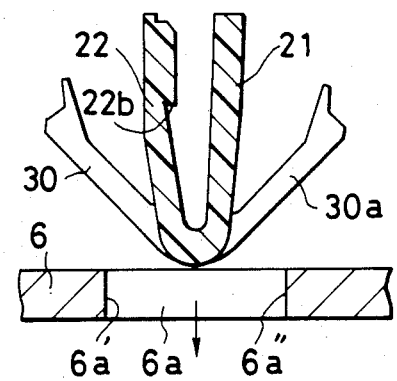
FIG. 8 is a sectional view showing a second embodiment of the fastener according to the invention.

FIG. 8 shows a second embodiment of the plastic fastener according to the invention.

In this embodiment, the side wall 21 is also provided with an elastic engagement piece 30a, so that the two elastic engagement pieces 30 and 30a are engaged with the respective side edges 6a' and 6a" of the mounting hole 6a. Thus, in this embodiment the side wall 21 has no shoulder.

Figure 9:
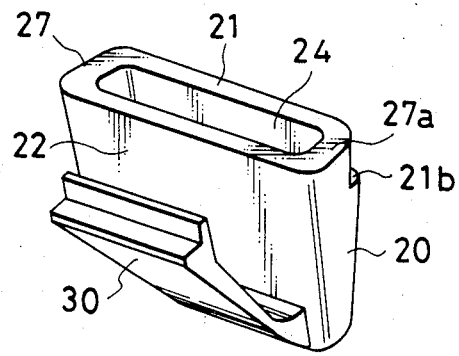
FIG. 9 is a perspective view showing a third embodiment of the fastener according to the invention.

FIG. 9 shows a third embodiment of the fastener according to the invention. In this embodiment, end walls 27 and 27a are provided at the opposite ends of the two side walls 21 and 22, so that the fastener is open only at top 24. The projection of the part is forced into the case-like body 20 from the open top, whereby the shoulder of the projection of the part and the shoulder of the side wall 22 are strongly engaged with each other.

Figure 10:
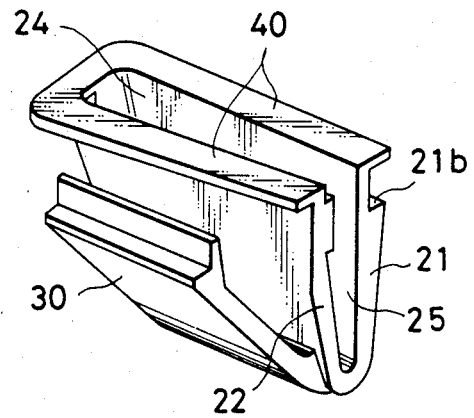
FIG. 10 is a perspective view showing a fourth embodiment of the invention.

FIG. 10 shows a fourth embodiment of the fastener according to the invention. In this embodiment, a flange 40 is formed along the edge of the open top 24. With this arrangement, when the part is secured to a vehicle body, the mounting hole is closed by the flange. Thus, the sealing property can be improved. Also, the coupling force between the projection of the part and the fastener is enhanced owing to the presence of the flange.

While some preferred embodiments of the invention have been described in the foregoing, they are by no means limitative, and various changes and modifications are possible without departing from the scope of the invention. For example, the structure of the case-like body may be replaced with one in which two side walls are coupled together by beams. Also, the shape of the case-like body may be changed variously depending on the shape of the projection of the part.

Further, while the above embodiments relate to a vehicle part, this is by no means limitative, and the fastener according to the invention may of course be used for fastening other objects.

As has been described in the foregoing, according to the invention the part can be mounted by merely fitting the fastener on the projection of the part and then forcibly inserting it through the mounting hole of the support. The part thus can be mounted in an operation which is performed on only one side of the support, and the operability can be greatly improved. Further, since the fastener is made of a plastic material, it will not rust or corrode so that it can be used for a long time. Further, since the elastic engagement piece is strongly engaged with the edge of the mounting hole of the support, there is no possibility of detachment of the part or displacement of the mounted part.

What is claimed is:

1. A plastic fastener comprising: a body including two side walls facing and spaced apart from each other and having upper and lower portions, one of said side walls being provided on the inner side with a shoulder facing toward said lower portions; and at least one elastic engagement piece extending obliquely upwardly from the lower portion of at least one of said side walls and having a lock piece provided at the free end, said lock piece having an outer surface and an upper free end, said lock piece including an upwardly directed shoulder on said outer surface, whereby a projection from a workpiece can be retained in said fastener and said fastener mounted in an aperture in a mounting wall.

2. The plastic fastener according to claim 1, wherein said two spaced side walls are coupled together by a bottom wall.

3. The plastic fastener according to claim 1, wherein said two spaced side walls are coupled together by an end wall at one end.

4. The plastic fastener according to claim 2, wherein said two spaced side walls are coupled together by end walls at both ends.

5. The plastic fastener according to claim 1, wherein said side wall other than the one provided with said elastic engagement piece has an upper reduced thickness portion.

* * * * *